United States Patent [19]

Sato

[11] Patent Number: 5,168,305
[45] Date of Patent: Dec. 1, 1992

[54] OPTICAL SYSTEM CONTROL MECHANISM
[75] Inventor: Kazuo Sato, Tokyo, Japan
[73] Assignee: Konica Corporation, Tokyo, Japan
[21] Appl. No.: 726,339
[22] Filed: Jul. 5, 1991
[30] Foreign Application Priority Data Jul. 6, 1990 [JP] Japan .................. 2-178532

[51] Int. Cl.$^5$ .............................. G03B 27/50
[52] U.S. Cl. ........................ 355/51; 355/56; 355/235; 318/687
[58] Field of Search ............ 355/51, 55, 56, 235, 355/83, 84, 77, 233, 243

[56] References Cited

U.S. PATENT DOCUMENTS 3,767,302 10/1973 Roberts .................... 355/54 X
4,461,984 7/1984 Whitaker et al. .......... 318/687

Primary Examiner—Michael L. Gellner
Assistant Examiner—D. Rutledge
Attorney, Agent, or Firm—Finnegan, Henderson, Farabow, Garrett and Dunner

[57] ABSTRACT

A control mechanism for an optical system wherein a scanning operation by an optical system is controlled by the amount and the direction of an electric current supplied to an optical system drive motor; and wherein a current limiter value modifying means for changing a current limiter value which stipulates a maximum current value for the optical system drive motor is provided which sets a smaller current limiter value during control of a return scan by the optical system than the current limiter value set during control of a forward scan by the optical system.

3 Claims, 3 Drawing Sheets

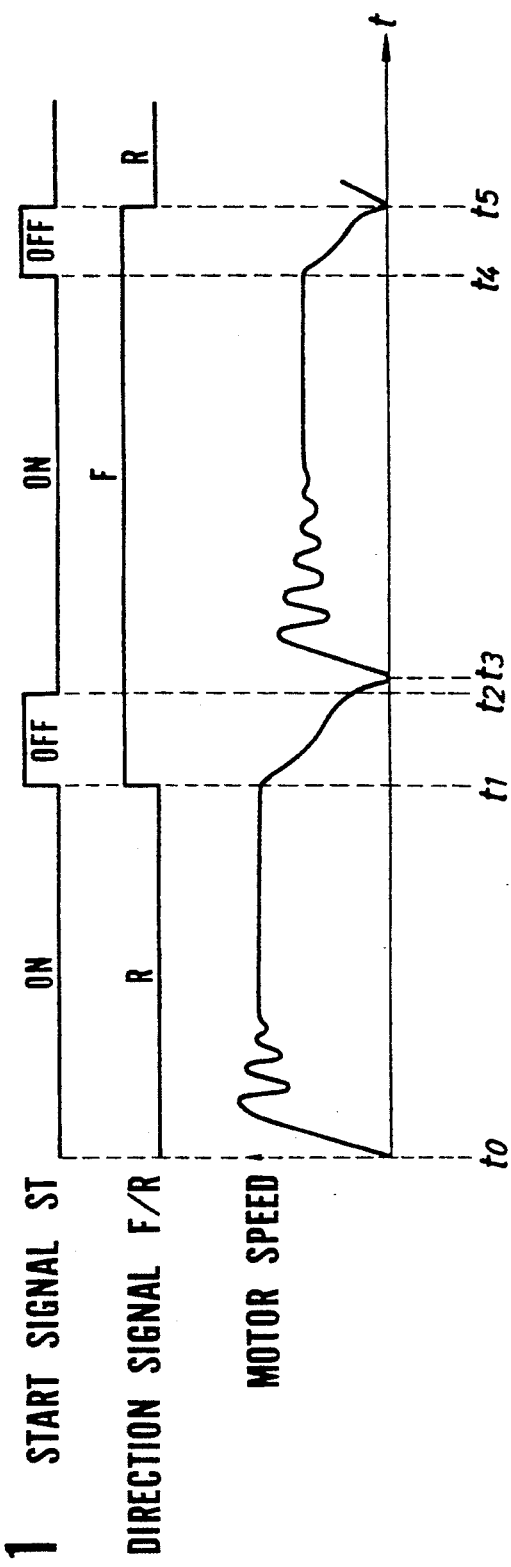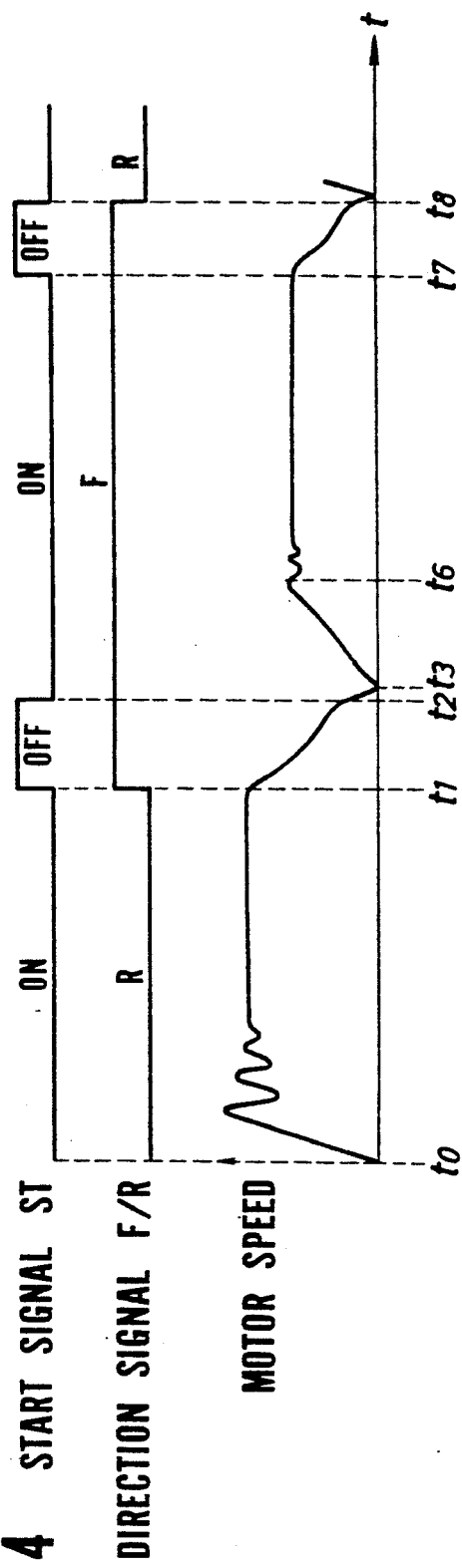

OPTICAL SYSTEM CONTROL MECHANISM

BACKGROUND OF THE INVENTION

1. Field of the Invention

The present invention relates to a control mechanism for an optical system, and, in particular, to a control mechanism for an optical system in an image-forming device such as a copying machine and the like.

2. Description of the Prior Art

Scanning by an optical system in an image forming device is generally controlled by the amount and the direction of an electric current supplied in the DC mode. To prevent blurring of the image and to ensure the specifications are met, both a forward and a return scan and negative feedback control using PLL are used.

In the conventional technology mentioned above, for PLL control, a specific scanning velocity is maintained along the scan, and when the forward or the return scan is commenced a transient current flows so that an overshoot or undershoot is produced in the motor speed waveform.

FIG. 1 is a view showing the circumstances of the development of such a problem point.

A direction signal F indicates a forward scan and R indicates a return scan. A start signal ST is OFF only during times $t_1$ to $t_2$ and $t_4$ to $t_5$.

At the initial period of the forward and return scans, it can be seen that a large change (overshoot, undershoot) occurs in the motor speed.

In the return scan, if the return time is maintained within a set specification there is no problem, but because a document is copied during the forward scan, there is concern that a blurring of the image at the leading edge of the document will be produced.

SUMMARY OF THE INVENTION

An object of the present invention is to provide, with due consideration to the drawbacks of such conventional devices, a control mechanism for an optical system suitable for use with an image-forming device such as a copying machine and the like, by which a blurring of the image at the leading edge of the document is not produced.

This object is achieved in the present invention by the provision of a control mechanism for an optical system wherein a scanning operation by an optical system is controlled by the amount and the direction of an electric current supplied to an optical system drive motor; and wherein a current limiter value modifying means for changing a current limiter value which stipulates a maximum current value for the optical system drive motor is provided which sets a smaller current limiter value during control of a return scan by the optical system than the current limiter value set during control of a forward scan by the optical system.

The rate of change of excess current when a scan by the optical system commences (when a control voltage is applied) changes according to a current limiter set value for a DC motor (an optical system drive motor). When the set value is large, the amplitude of an overshoot or the like is also large because a large current flows, but when the set value is small the change can be restrained. Accordingly, the current limiter value of the DC motor is switched according to the scanning direction, and during scanning in the exposure direction (the forward direction) the current limiter value is small, a damping effect is obtained, and the current (voltage) change is restrained. On the other hand, during control of the return scan, the current limiter value is large, a strong acceleration is obtained with a sharp onset, and the time required for the return is reduced.

BRIEF DESCRIPTION OF ACCOMPANYING DRAWINGS

These and other objects, features, and advantages of the present invention will become more apparent from the following description of the preferred embodiments taken in conjunction with the accompanying drawings, in which:

FIG. 1 is a view for explaining the circumstances of a change such as an overshoot or the like in a conventional example.

FIG. 4 is a view for explaining the change restraining effect on an overshoot or the like with the embodiment of FIG. 2.

DETAILED DESCRIPTION OF THE PREFERRED EMBODIMENTS

Other features of this invention will become apparent in the course of the following description of an exemplary embodiment which is given for illustration of the invention and is not intended to be limiting thereof.

Figure 2:
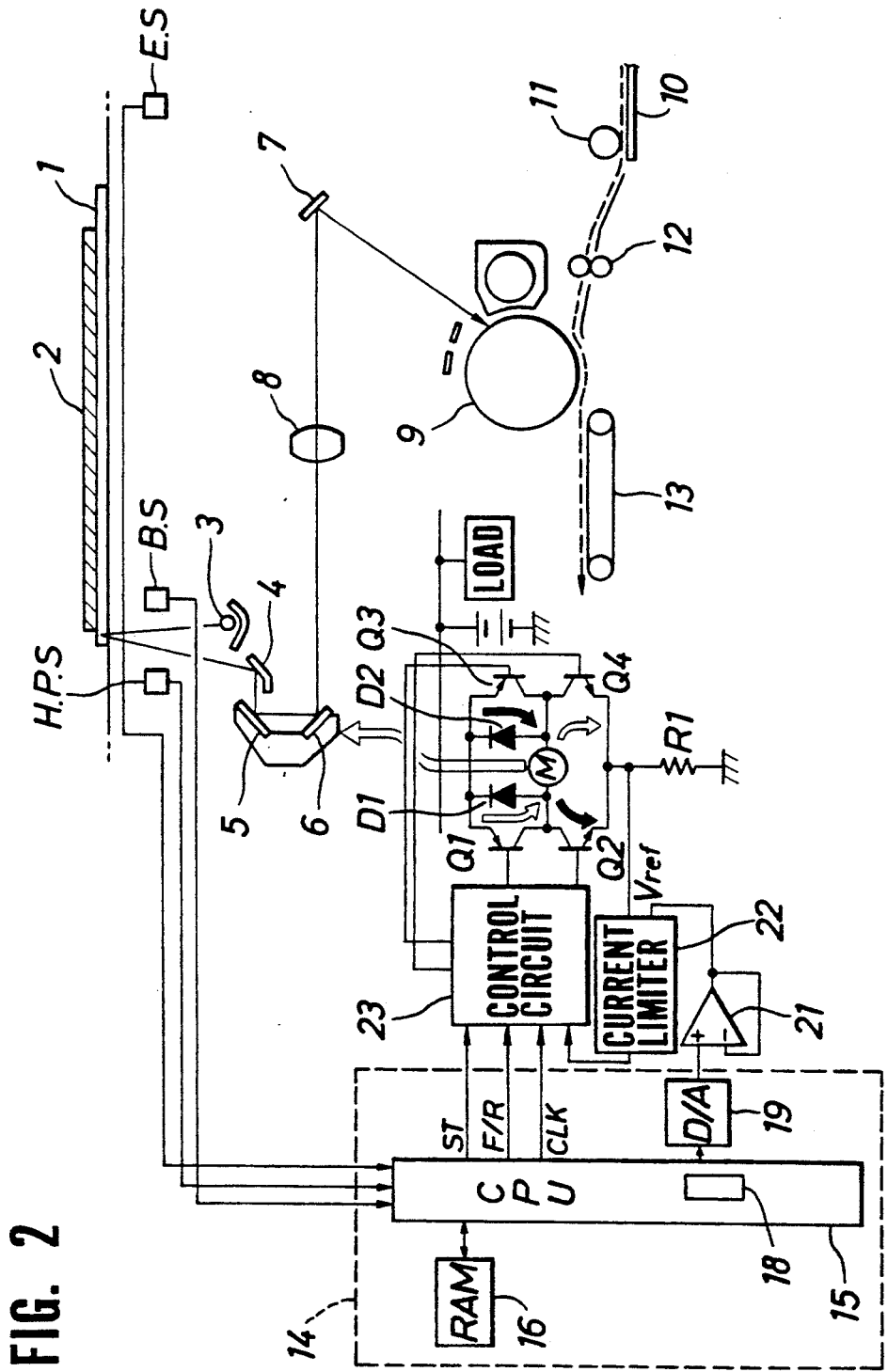
FIG. 2 is a view showing the configuration of one embodiment of the present invention.

Now referring to FIG. 2, this is a view showing the configuration of one embodiment of the present invention.

A document 2 which is to be copied is positioned on a document table 1 for scanning of the surface of the document 2 by an optical system. The optical system comprises an exposure lamp 3, a plurality of mirrors 4, 5, 6 (a V-mirror unit), a main lens 8, and a mirror 7.

Light reflected from the document surface is incident upon a photoreceptor drum 9 whereon an electrostatic latent image is formed. A transfer sheet is loaded onto a transfer sheet tray 10 and is fed out by means of a first paper feed roller 11 and a second paper feed roller 12. After the image on the photoreceptor drum 9 has been transferred, the transfer sheet is conveyed via a conveyor belt 13.

An optical system drive motor M (DC motor) is driven by a motor drive circuit comprising a pair of PNP transistors Q1, Q3; a pair of NPN transistors Q2, Q4; a pair of diodes D1, D2; and a resistance R1. The operation of the motor drive circuit is controlled by means of a control circuit 23 provided with a PLL circuit or the like. A start signal ST, a direction signal F/R, and a clock pulse CLK are supplied to the control circuit 23 from a CPU 15 of a controller 14. A voltage applied between the two ends of the resistance R1 is compared with a set value in a current limiter 22, and a signal showing the result of the comparisonis supplied to the control circuit 23.

The set value (limiter value) of the current limiter 22 can be changed on instructions from the CPU 15, and such a modification is performed by modifying a value which is set in a register 18 in the CPU 15. The limiter value set in the register 18 is converted by a D/A converter 19 to an analogue value and is applied to the current limiter 22 as a reference voltage through a voltage follower 21.

The CPU 15 contains a main memory 16 in which are recorded various items of data. The CPU 15 provides overall control of the operation of the copying machine, utilizing this recording space and the recorded data. The CPU 15 also receives positional data for the optical system from a home position sensor HPS, a brake sensor BS, and an exposure completion sensor ES.

The characteristic operation of an embodiment of the present invention will now be explained.

Figure 3:
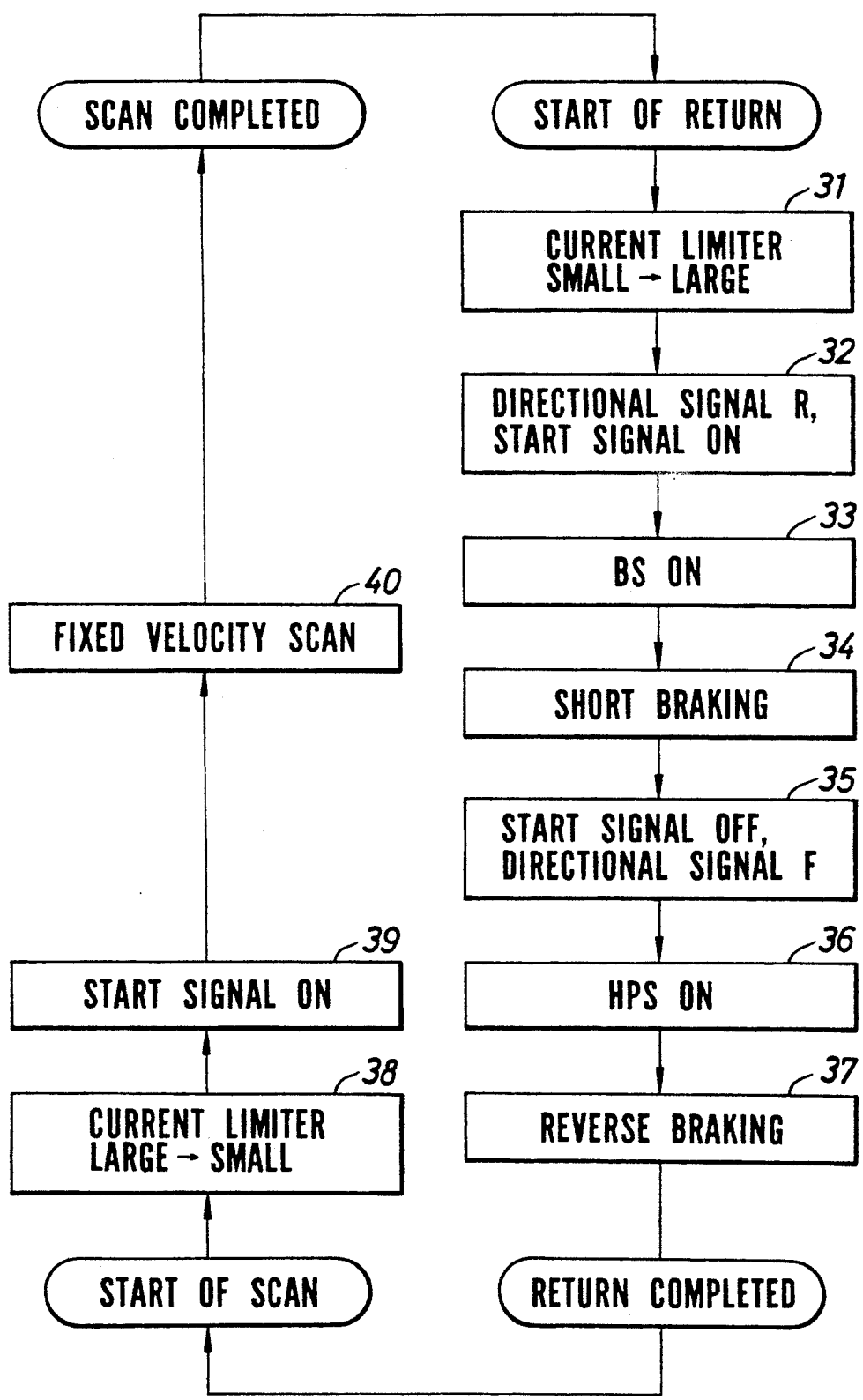
FIG. 3 is a flowchart showing the control procedures by a CPU.

FIG. 3 is a flowchart showing the control procedures by the CPU 15.

For a return scan, first, the current limiter value is changed from a small value to a large value (when two-value control is applied) (Step 31). Next, the directional signal is set to R and the start signal to ON (Step 32).

When the optical system reaches the position of the brake sensor BS and turns the brake sensor BS ON (Step 33), the NPN transistors Q2, Q4 of the drive circuit are turned OFF and the current flows through the diodes D1, D2. A short braking is applied (Step 34), and at this time the start signal is turned OFF and the directional signal is switched to F (Step 35). When the home position sensor HPS comes ON (Step 36), the drive current of the motor is reversed and reverse braking is applied (Step 37). This completes the return pass of the optical system.

In the case of an exposure scan, the current limiter value is switched from a large value to a small value (Step 38) and the start signal is turned ON (Step 39).

The scan is then performed under fixed velocity control from the PLL circuit.

The circumstances of the change of control voltage when the current limiter value is switched in this manner for both the forward scan and the return scan are illustrated in FIG. 4.

The return scan proceeds in the same manner as in a conventional system, but when the exposure scan is performed, the onset of the control voltage exhibits a shallower slope (time $t_3$ to $t_6$) and the overshoot and undershoot are seen to diminish.

In the embodiment described in the foregoing, the current limiter value is switched between two values-a large and a small. However, in the case of fine control corresponding to the magnification of the copy, the current limiter value can be switched among a plurality of values.

With the present invention, as can be readily understood from the preceding explanation, by switching the current delimiter value of the drive circuit of the DC motor in the mechanism which drives the optical system, according to the direction of the scan, the following results are obtained. It is preferable that the timing of the switching be adjustable so as to obtain an appropriate result.

(1) Overshoot and undershoot are restrained when scanning in the exposure direction through a damping effect, so that no blurring of the image is produced. This results in an improvement in image quality.

(2) During the return scan, a strong acceleration is obtained and the return is fast, so that the time required for the combined forward and return scans by the optical system is not increased appreciably.

(3) The current delimiter value can be readily changed through internal control from the CPU so that a complicated equipment configuration is unnecessary.

(4) As a result, the performance and reliability of the device are improved.

What we claim is:

1. A control mechanism for an optical system, comprising:
    means for scanning the optical system, the scanning means including an optical drive system motor and means for driving the optical system in a forward scanning direction and a return direction; and
    means for controlling the scanning means by regulating the amount and direction of an electric current supplied to the motor, the controlling means including current limiter value modifying means for limiting a maximum current supplied to the motor so that the maximum current is greater when the optical system is driven in the return direction than when the optical system is driven in the forward scanning direction.

2. A control mechanism for an optical system, capable of varying magnification levels, comprising:
    means for scanning the optical system, the scanning means including an optical drive system motor and means for driving the optical system in a forward scanning direction and a return direction; and
    means for controlling the scanning means by regulating the amount and direction of an electric current supplied to the motor, the controlling means including current limiter value modifying means for limiting the maximum current supplied to the motor so that the maximum current is greater when the optical system is driven in the return direction than when the optical system is driven in the forward scanning direction and so that the maximum current is varied in accordance with the varying magnification levels.

3. A control mechanism, including a CPU, for controlling an optical system, comprising:
    means for scanning the optical system, the scanning means including an optical drive system motor and means for driving the optical system in a forward scanning direction and a return direction; and
    means for controlling the scanning means by regulating the amount and direction of an electric current supplied to the motor, the controlling means including current limiter value modifying means for limiting a maximum current supplied to the motor so that the maximum current is greater when the optical system is driven in the return direction than when the optical system is driven in the forward scanning direction,
    wherein the current limiter value modifying means includes a register in the CPU for setting a maximum current value.

* * * * *